United States Patent
Tang

(10) Patent No.: US 11,546,852 B2
(45) Date of Patent: Jan. 3, 2023

(54) METHOD AND DEVICE FOR SIGNAL TRANSMISSION

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/031,071

(22) Filed: Sep. 24, 2020

(65) Prior Publication Data

US 2021/0007051 A1 Jan. 7, 2021

Related U.S. Application Data

(63) Continuation of application No. PCT/CN2018/081456, filed on Mar. 30, 2018.

(51) Int. Cl.
*H04W 52/02* (2009.01)
*H04W 68/00* (2009.01)
*H04W 72/04* (2009.01)

(52) U.S. Cl.
CPC ..... *H04W 52/0229* (2013.01); *H04W 68/005* (2013.01); *H04W 72/044* (2013.01)

(58) Field of Classification Search
CPC ........... H04W 52/0229; H04W 68/005; H04W 72/044; H04W 52/0235; H04W 56/0015;
(Continued)

(56) References Cited

U.S. PATENT DOCUMENTS

| 10,609,676 B1 | 3/2020 | Agiwal et al. |
| 2016/0119895 A1 | 4/2016 | Agiwal et al. |

(Continued)

FOREIGN PATENT DOCUMENTS

| CN | 104426830 A | 3/2015 |
| CN | 106170930 A | 11/2016 |
| CN | 106416386 A | 2/2017 |

OTHER PUBLICATIONS

Nokia et al: "Summary of QCL", 3GPP Draft; R1-1803328-Athens-Summary of QCL, 3rd Generation Partnership Project(3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 28, 2018 (Feb. 28, 2018), XP051398516, Retrieved from the Internet: URL: http://www.3gpp.org/ftp/tsg%5Fran/WG1%5FRL1/TSGR1%5F92/Docs/ [retrieved on Feb. 28, 2018]*sections 1-4, appendix *.

(Continued)

*Primary Examiner* — Marcos L Torres
(74) *Attorney, Agent, or Firm* — Perkins Coie LLP

(57) ABSTRACT

A method and a device for signal transmission are provided, the method comprising: a terminal device determining a QCL relationship between a paging related signal and an energy saving signal, wherein the paging related signal comprises a physical downlink control channel (PDCCH) for scheduling a paging message and/or a physical downlink shared channel (PDSCH) carrying the paging message; and the terminal device receiving the energy saving signal on the basis of the QCL relationship, or the terminal device receiving the paging related signal on the basis of the QCL relationship.

19 Claims, 4 Drawing Sheets

(58) Field of Classification Search
CPC ............. H04W 52/0216; H04W 76/28; H04W 16/28; H04W 52/0212; Y02D 30/70; H04B 17/373; H04L 5/0051; H04L 5/0023

See application file for complete search history.

(56) References Cited

U.S. PATENT DOCUMENTS

| | | | |
|---|---|---|---|
| 2017/0202025 | A1 | 7/2017 | Ouchi et al. |
| 2017/0215097 | A1 | 7/2017 | Park et al. |
| 2017/0339665 | A1 | 11/2017 | Agiwal et al. |
| 2017/0367069 | A1 | 12/2017 | Agiwal et al. |
| 2018/0115959 | A9 | 4/2018 | Agiwal et al. |
| 2019/0159165 | A1 | 5/2019 | Agiwal et al. |
| 2019/0327710 | A1* | 10/2019 | Liu ................. H04W 68/02 |
| 2020/0077359 | A1 | 3/2020 | Agiwal et al. |
| 2020/0236647 | A1 | 7/2020 | Agiwal et al. |
| 2020/0367197 | A1 | 11/2020 | Agiwal et al. |

OTHER PUBLICATIONS

Qualcomm Incorporated: "Remaining Details on QCL", 3GPP Draft; R1-1802832, 3rd Generation Partnership Project (3GPP), Mobile Competence Centre; 650, Route Des Lucioles; F-06921 Sophia-Antipolis Cedex; France, Feb. 17, 2018 (Feb. 17, 2018), pp. 1-12, XP051398245, Retrieved from the Internet: URL: http://www.3gpp.org/ftp/tsg%5Fran/WG1%5FRL1/TSGR1%5F92/Docs/ [retrieved on Feb. 17, 2018] *sections 1.-6. *.

MCC Support: "Final Report of 3GPP TSG RAN WG1 #89 v1.0.0", 3GPP Draft; Final Minutes Report RAN1#89 V100, 3rd Generation Partnership Project (3GPP), Mobile Competence Centre; 650, Route Des Lucioles; F-06921 Sophia-Antipolis Cedex; France vol. RAN WG1, No. Prague, Czech Rep; Aug. 21, 2017-Aug. 25, 2017, Aug. 20, 2017 (Aug. 20, 2017), XP051328122, Retrieved from the Internet: URL: http://www.3gpp.org/ftp/tsg_ran/WG1_RL1/TSGR1_90/Docs/ [retrieved on Aug. 20, 2017] * sections 6.2, 7.1.1, 7.1.2 *.

Supplementary European Search Report in the European application No. 18912448.0, dated Feb. 8, 2021.

Written Opinion of the International Search Authority in the international application No. PCT/CN2018/081456, dated Jan. 4, 2019.

CATT. "Issues on RX Beam Sweeping for Paging" 3GPP TSG-RAN WG2 Meeting #101, R2-1801838, (Mar. 2, 2018 (Mar. 2, 2018), sections 1 and 2.

Interdigital, Inc. "NR paging based on paging indication" 3GPP TSG-RAN WG1 Meeting #90, R1-1714119, Aug. 25, 2017 (Aug. 25, 2017), entire document.

International Search Report in the international application No. PCT/CN2018/081456, dated Jan. 4, 2019.

First Office Action of the Korean application No. 10-2020-7031326, dated Jan. 3, 2022. 12 pages with English translation.

Office Action of the Indian application No. 202017046530, dated Dec. 7, 2021. 6 pages with English translation.

* cited by examiner

METHOD AND DEVICE FOR SIGNAL TRANSMISSION

CROSS-REFERENCE TO RELATED APPLICATION

This is a continuation application of International Patent Application No. PCT/CN2018/081456, filed on Mar. 30, 2018, the contents of which are hereby incorporated by reference in its entirety.

BACKGROUND

Considering power saving of a terminal device, a Discontinuous Reception (DRX) mechanism is introduced. Each DRX cycle includes an on duration and an opportunity for DRX. Within the on duration, the terminal device detects a control channel. Within the opportunity for DRX (also called a sleep duration), the terminal device may stop receiving the control channel (in such case, the terminal device may stop blind detection for the control channel) to reduce power consumption, thereby prolonging the service time of a battery.

In a 5th-Generation (5G) system, a power saving signal is introduced to control a state of a terminal device to achieve a purpose of power saving. For example, the power saving signal may be a wakeup signal, and the wakeup signal is configured to instruct the terminal device to wake up in an "on duration" of a DRX cycle, the terminal device, responsive to that the wakeup signal is detected, may wake up in the "on duration" to detect a Physical Downlink Control Channel (PDCCH); and the terminal device, responsive to that no wakeup signal is detected, may not detect the PDCCH.

Therefore, how to ensure the transmission performance of such a power saving signal to further save power for a terminal device becomes a problem urgent to be solved.

SUMMARY

Embodiments of the disclosure relate to the field of communication, and more particularly to a method and device for signal transmission, which may improve the transmission performance of a power saving signal and another signal associated with the power saving signal and further reduce the power consumption of the terminal device.

In a first aspect, a method for signal transmission is provided, which may include that: a terminal device determines a Quasi-Co-Located (QCL) relation between a paging related signal and a power saving signal, the paging related signal including a PDCCH for scheduling a paging message and/or a Physical Downlink Shared Channel (PDSCH) for bearing the paging message; and the terminal device receives the power saving signal based on the QCL relation, or the terminal device receives the paging related signal based on the QCL relation.

Accordingly, by establishing the QCL relation between the paging related signal and the power saving signal, the terminal device, after determining a receiving beam and corresponding spatial receiving parameter of the paging message, may receive the power saving signal based on the receiving beam and spatial receiving parameter of the paging message, thereby avoiding receiving of the power saving signal on all beams sent by a network device, and achieving power saving.

In combination with the first aspect, in a possible implementation of the first aspect, the QCL relation between the paging related signal and the power saving signal may represent that a De Modulation Reference Signal (DMRS) antenna port for receiving the paging related signal and a DMRS antenna port associated with reception of the power saving signal meet the QCL relation.

In combination with the first aspect or any abovementioned possible implementation, in another possible implementation of the first aspect, the QCL relation may include a QCL relation between the paging related signal and the power saving signal in terms of at least one of a delay spread, a Doppler spread, a Doppler shift, an average delay and a spatial receiving parameter.

In combination with the first aspect or any abovementioned possible implementation, in another possible implementation of the first aspect, the QCL relation may include a QCL relation between the paging related signal and a power saving signal associated with the paging related signal.

The power saving signal associated with the paging related signal may include a power saving signal meeting a predetermined relation with the paging related signal in a time domain and/or a frequency domain.

In combination with the first aspect or any abovementioned possible implementation, in another possible implementation of the first aspect, the operation that the terminal device determines the QCL relation between the paging related signal and the power saving signal may include that: the terminal device acquires the QCL relation pre-stored in the terminal device; or, the terminal device receives configuration information sent by a network device, the configuration information being used to indicate the QCL relation.

In combination with the first aspect or any abovementioned possible implementation, in another possible implementation of the first aspect, the QCL relation may include a QCL relation in terms of the spatial receiving parameter; and the operation that the terminal device receives the power saving signal based on the QCL relation may include that: the terminal device receives the power saving signal by use of an optimal receiving beam of the paging related signal and a spatial receiving parameter corresponding to the optimal receiving beam.

Accordingly, in the embodiments of the disclosure, by establishing the QCL relation between the paging related signal and the power saving signal, the terminal device, after determining the receiving beam and corresponding spatial receiving parameter of the paging message, may receive the power saving signal based on the receiving beam and spatial receiving parameter of the paging message, thereby avoiding receiving of the power saving signal on all beams sent by a network device, and achieving power saving.

In combination with the first aspect or any abovementioned possible implementation, in another possible implementation of the first aspect, the method may further include that: the terminal device performs time-frequency synchronization based on the power saving signal and acquires a time-frequency synchronization parameter of the power saving signal; and the operation that the terminal device receives the paging related signal based on the QCL relation may include that: the terminal device receives the paging related signal by use of the time-frequency synchronization parameter of the power saving signal.

Accordingly, in the embodiments, when the terminal device determines based on the indication of the power saving signal that there is a transmission of a paging message in a specific paging cycle, the terminal device is required to receive the paging message in the paging cycle. If the power saving signal is a segment of sequence and the segment of sequence has a time-frequency synchronization function, the terminal device may perform time-frequency synchronization based on the power saving signal, acquire the time-frequency synchronization parameter of the power saving signal, such as information of a time deviation and a frequency deviation; and receive, based on the time-frequency synchronization parameter, the paging related signal meeting the QCL relation between the paging related signal and the power saving signal, so that the reception performance of the paging related signal may be improved.

In combination with the first aspect or any abovementioned possible implementation, in another possible implementation of the first aspect, the method may further include that: the terminal device determines a timing relation between the paging related signal and the power saving signal; the operation that the terminal device receives the power saving signal based on the QCL relation may include that: the terminal device receives the power saving signal based on the QCL relation and the timing relation; and the operation that the terminal device receives the paging related signal based on the QCL relation may include that: the terminal device receives the paging related signal based on the QCL relation and the timing relation.

In a second aspect, a method for signal transmission is provided, which may include that: a network device sends a power saving signal and a paging related signal to enable a terminal device to receive the paging related signal or the power saving signal based on a QCL relation between the paging related signal and the power saving signal, the paging related signal including a PDCCH for scheduling a paging message and/or a PDSCH for bearing the paging message.

Accordingly, by establishing the QCL relation between the paging related signal and the power saving signal, the terminal device, after determining a receiving beam and corresponding spatial receiving parameter of the paging message, may receive the power saving signal based on the receiving beam and spatial receiving parameter of the paging message, thereby avoiding receiving of the power saving signal on all beams sent by a network device, and achieving power saving.

In combination with the second aspect, in a possible implementation of the second aspect, the QCL relation between the paging related signal and the power saving signal may represent that a DMRS antenna port for receiving the paging related signal and a DMRS antenna port associated with reception of the power saving signal meet the QCL relation.

In combination with the second aspect or any abovementioned possible implementation, in another possible implementation of the second aspect, the QCL relation may include a QCL relation between the paging related signal and the power saving signal in terms of at least one of: a delay spread, a Doppler spread, a Doppler shift, an average delay or a spatial receiving parameter.

In combination with the second aspect or any abovementioned possible implementation, in another possible implementation of the second aspect, the QCL relation may include a QCL relation between the paging related signal and a power saving signal associated with the paging related signal.

The power saving signal associated with the paging related signal may include a power saving signal meeting a predetermined relation with the paging related signal in a time domain and/or a frequency domain.

In combination with the second aspect or any abovementioned possible implementation, in another possible implementation of the second aspect, the QCL relation may include a QCL relation in terms of the spatial receiving parameter; and the operation that the network device sends the power saving signal and the paging related signal may include that: the network device sends the paging related signal, and sends the power saving signal associated with the paging related signal by use of a sending beam of the paging related signal.

In combination with the second aspect or any abovementioned possible implementation, in another possible implementation of the second aspect, the method may further include that: the network device determines a timing relation between the paging related signal and the power saving signal.

The operation that the network device sends the power saving signal and the paging related signal may include that: the network device sends the power saving signal and the paging related signal according to the timing relation.

In combination with the second aspect or any abovementioned possible implementation, in another possible implementation of the second aspect, the method may further include that: the network device sends configuration information to the terminal device, the configuration information being used to indicate the QCL relation.

In a third aspect, a terminal device is provided, which may execute the operations of the terminal device in the first aspect or any optional implementation of the first aspect. Specifically, the terminal device may include a terminal device configured to execute the operations in the first aspect or any possible implementation of the first aspect.

In a fourth aspect, a network device is provided, which may execute the operations of the network device in the second aspect or any optional implementation of the second aspect. Specifically, the network device may include a network device configured to execute the operations in the second aspect or any possible implementation of the second aspect.

In a fifth aspect, a terminal device is provided, which includes a processor, a transceiver and a memory. The processor, the transceiver and the memory communicate with one another through an internal connecting path. The memory is configured to store an instruction, and the processor is configured to execute the instruction stored in the memory. When the processor executes the instruction stored in the memory, such execution enables the terminal device to execute the method in the first aspect or any possible implementation of the first aspect, or such execution enables the terminal device to implement the terminal device provided in the third aspect.

In a sixth aspect, a network device is provided, which includes a processor, a transceiver and a memory. The processor, the transceiver and the memory communicate with one another through an internal connecting path. The memory is configured to store an instruction, and the processor is configured to execute the instruction stored in the memory. When the processor executes the instruction stored in the memory, such execution enables the network device to execute the method in the second aspect or any possible implementation of the second aspect, or such execution enables the network device to implement the network device provided in the fourth aspect.

In a seventh aspect, a system chip is provided, which includes an input interface, an output interface, a processor and a memory. The processor is configured to execute an instruction stored in the memory. When the instruction is executed, the processor may implement the method in the first aspect or any possible implementation of the first aspect.

In an eighth aspect, a system chip is provided, which includes an input interface, an output interface, a processor and a memory. The processor is configured to execute an instruction stored in the memory. When the instruction is executed, the processor may implement the method in the second aspect or any possible implementation of the second aspect.

In a ninth aspect, a computer program product including an instruction is provided, which runs in a computer to enable the computer to execute the method in the first aspect or any possible implementation of the first aspect.

In a tenth aspect, a computer program product including an instruction is provided, which runs in a computer to enable the computer to execute the method in the second aspect or any possible implementation of the second aspect.

DETAILED DESCRIPTION

The technical solutions of the implementations of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
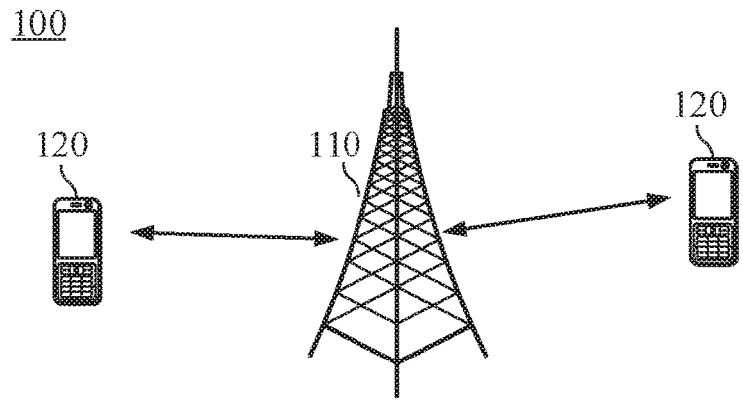
FIG. 1 is a schematic diagram of a possible wireless communication system to which the implementations of the disclosure are applied.

FIG. 1 illustrates a wireless communication system 100 to which the implementations of the disclosure are applied. The wireless communication system 100 may include a network device 110. The network device 100 may be a device communicating with a terminal device. The network device 100 may provide communication coverage for a specific geographical region and may communicate with a terminal device (for example, User Equipment (UE)) in the coverage. Optionally, the network device 100 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle device, a wearable device, a terminal device in the future 5G network, a terminal device in the future evolved PLMN or the like. Optionally, the terminal device 120 may also perform Device to Device (D2D) communication.

One network device and two terminal devices are exemplarily illustrated in FIG. 1. Optionally, the wireless communication system 100 may include multiple network devices and another number of terminal devices may be included in coverage of each network device. There are no limits made thereto in the implementations of the disclosure.

Optionally, the wireless communication system 100 may further include another network entity such as a network controller and a mobility management entity. There are no limits made thereto in the implementations of the disclosure.

Figure 2:
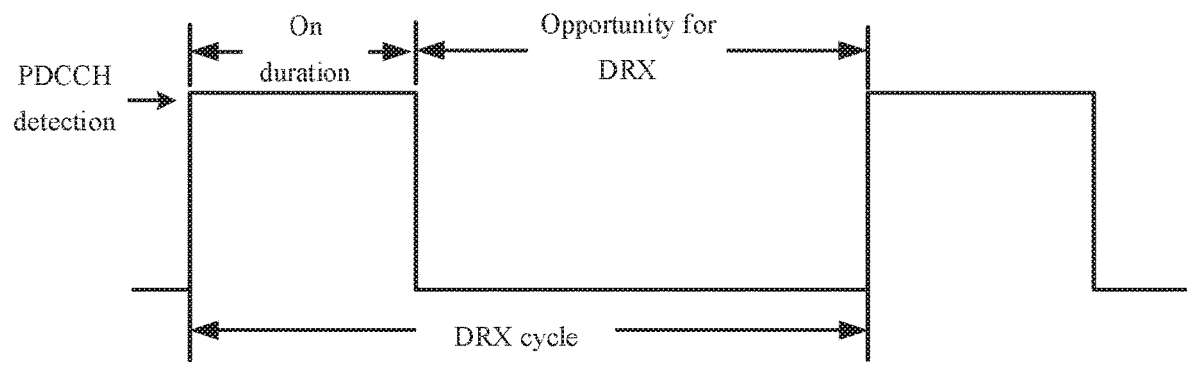
FIG. 2 is a schematic diagram of a DRX cycle.

A DRX cycle of the terminal device includes an on duration and an opportunity for DRX. For example, as illustrated in FIG. 2, the terminal device may detect a PDCCH within the on duration, and the terminal device may stop receiving the PDCCH within the opportunity for DRX (in such case, the terminal device may stop blind detection over the PDCCH or a paging message) to reduce power consumption, thereby prolonging service time of a battery. That is, the terminal device is in a wakeup state within the on duration and thus detects the PDCCH, and the terminal device enters a sleep state within the opportunity for DRX and thus stops channel detection or signal detection.

A network configures the DRX cycle for the terminal device to enable the terminal device to periodically detect a PDCCH within the on duration. However, the terminal device is only opportunistically scheduled within the on duration, and the terminal device may even be scheduled only within a few DRX cycles under the circumstance that a service load is low. For a paging message for which the DRX mechanism is adopted, there are fewer opportunities for the terminal device to receive the paging message. Therefore, after configuration of the DRX mechanism, the terminal device may not detect any control channel within on durations of most of DRX cycles, but the terminal device may still wake up within the on durations of these DRX cycles, which increases unnecessary power consumption of the terminal device.

Therefore, a power saving signal is introduced to a 5G system to control a state of the terminal device to achieve power saving. The power saving signal is configured to control the wakeup and sleep states of the terminal device to reduce the power consumption of the terminal device. For example, the power saving signal may be a wakeup signal, the wakeup signal is configured to instruct the terminal device to wake up in the on duration of the DRX cycle, the terminal device, responsive to that the wakeup signal is detected, may wake up to detect a PDCCH in next one or more "on durations", and the terminal device, responsive to that no wakeup signal is detected, may be kept in the sleep state and not detect the PDCCH in the next one or more "on durations". Or, the wakeup signal is configured to instruct the terminal device to sleep in the "on duration" of the DRX cycle, the terminal device, responsive to that no wakeup signal is detected, may normally wake up to detect the PDCCH in the next one or more "on durations", and the terminal device, responsive to that the wakeup signal is detected, may be kept in the sleep state and not detect the PDCCH in the next one or more "on durations". Such indication information is favorable for power saving of the terminal device, and is called a power saving signal.

Improving the transmission performance of the power saving signal may be favorable for further power saving of the terminal device. Therefore, it is proposed in the implementations of the disclosure that a QCL relation is established between reception of a power saving signal and reception of a paging message to improve the reception performance of the power saving signal and a paging related signal.

The terminal device receives the paging message in a specific subframe (called a Paging Occasion (PO)) in a specific frame (called a paging radio frame or a Paging Frame (PF)) in a paging cycle thereof. The terminal device may detect whether there is a paging message for the terminal device in the PO. The PO is a subframe, and there may be a PDCCH scrambled by a Paging Radio Network Temporary Identity (P-RNTI) and indicating the paging message in the subframe. When a DRX mechanism is adopted, the terminal device is required to detect only one PO in each DRX cycle. That is, corresponding to each terminal device, there is only one subframe configured to transmit a paging message in each paging cycle. Transmission of the paging message can also be understood as a DRX mechanism. A length of the paging cycle may be equal to a length of the DRX cycle.

Figure 3:
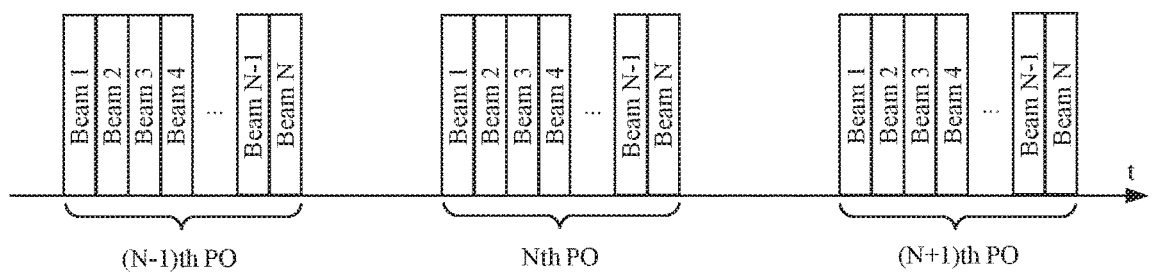
FIG. 3 is a schematic diagram of beam scanning for a paging message.

In the 5G system, beam scanning is required to be supported for sending of the paging message. That is, in each PO, the network device is required to send the paging message by use of each spatial beam in a beam scanning manner to ensure complete coverage of the paging message in a whole cell. For example, as illustrated in FIG. 3, in each PO, the network device may send the paging message by use of a beam 1 to a beam N to enable terminal devices at each position of the cell to detect the paging message.

Figure 4:
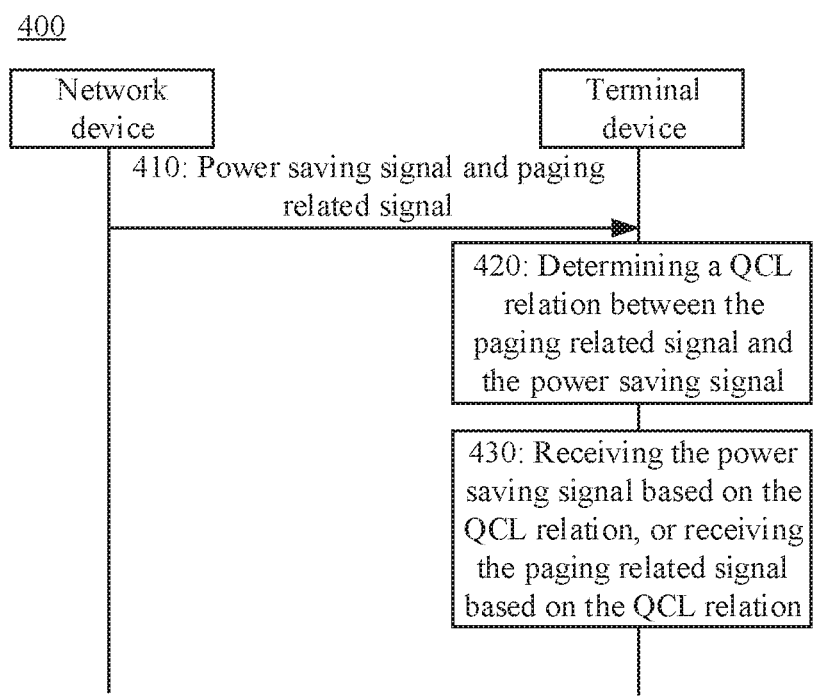
FIG. 4 is an interaction flowchart of a method for signal transmission according to an implementation of the disclosure.

FIG. 4 is an interaction flowchart of a method for signal transmission 400 according to an implementation of the disclosure. A terminal device illustrated in FIG. 4 may be, for example, the terminal device 120 illustrated in FIG. 1. A network device illustrated in FIG. 4 may be, for example, the network device 110 illustrated in FIG. 1. As illustrated in FIG. 4, the method 400 for signal transmission includes the following steps.

In 410, the network device sends a power saving signal and a paging related signal.

It can be understood that the network device may send the power saving signal and the paging related signal to the terminal device based on a QCL relation between the paging related signal and the power saving signal, so that the terminal device, when receiving the power saving signal or the paging related signal, may receive the paging related signal or the power saving signal based on the QCL relation between the paging related signal and the power saving signal.

Optionally, the paging related signal includes a PDCCH for scheduling a paging message and/or a PDSCH for bearing the paging message.

Or, the paging related signal may be the paging message or the PDCCH configured to schedule the paging message.

Optionally, the method further includes that: the network device sends configuration information to the terminal device, the configuration information being used to indicate the QCL relation.

In 420, the terminal device determines a QCL relation between the paging related signal and the power saving signal.

Optionally, the QCL relation between the paging related signal and the power saving signal represents that a DMRS antenna port for receiving the paging related signal and a DMRS antenna port associated with reception of the power saving signal meet the QCL relation.

Optionally, the QCL relation includes a QCL relation between the paging related signal and the power saving signal in terms of at least one of: a delay spread, a Doppler spread, a Doppler shift, an average delay or a spatial receiving parameter.

That is, the DMRS antenna port for receiving the paging related signal is QCL with the DMRS antenna port associated with reception of the power saving signal in terms of one or more of the delay spread, the Doppler spread, the Doppler shift, the average delay or the spatial receiving parameter.

For example, when the power saving signal and the paging related signal meet the QCL relation in terms of the average delay and the delay spread, the terminal device may obtain a time synchronization deviation of the paging related signal based on estimation of a time synchronization deviation of the power saving signal.

For another example, when the two signals meet the QCL relation in terms of the Doppler spread and the Doppler shift, the terminal device may obtain a frequency synchronization deviation of the paging related signal based on estimation of a frequency deviation of the power saving signal. Furthermore, the terminal device may compensate the time-frequency deviation of the paging related signal based on the obtained time synchronization deviation of the paging related signal and the frequency synchronization deviation of the paging related signal to improve the reception performance of the paging related signal.

For another example, when the power saving signal and the paging related signal meet the QCL relation in terms of the spatial receiving parameter, the two signals may be sent by the network device through the same sending beam. For a beam scanning scenario, both the paging related signal and the power saving related signal are sent in a beam scanning manner. If the quality of the paging related signal detected by the terminal device on a certain beam (for example, a beam i) is optimal, the terminal device may determine based on the QCL relation in terms of the spatial receiving parameter that the reception quality of the power saving signal sent by the beam i is also optimal. Correspondingly, the terminal device may directly detect the power saving signal based on the beam i and a corresponding receiving parameter and vice versa.

It is to be understood that, in the implementation of the disclosure, a beam for receiving a signal may be understood as a spatial domain reception filter for receiving the signal, and a beam for sending a signal may be understood as a spatial domain transmission filter for sending the signal. For two signals sent by use of the same spatial domain transmission filter, it can be understood that the two signals are QCL relative to a spatial receiving parameter.

Another understanding is that: if two antenna ports form a QCL relation (or subject to QCL, meeting the QCL relation, the two antenna ports are QCL), the terminal device may make such a hypothesis that a large-scale attribute and/or spatial receiving parameter, etc. of a signal or channel transmitted through one antenna port may be deduced from a signal or channel transmitted through the other antenna port. Or, the large-scale attribute and/or spatial receiving parameter, etc. of the signal or channel from one antenna port are/is the same as the large-scale attribute and/or spatial receiving parameter, etc. of the signal or channel from the other antenna port. The large-scale attribute may include, for example, parameters such as the abovementioned delay spread, Doppler spread, Doppler shift, average delay and average gain.

In the implementation, the DMRS antenna port associated with reception of the power saving signal may be understood as that the DMRS antenna port is a DMRS antenna port configured to transmit the power saving signal. However, when the power saving signal does not carry a DMRS sequence, for example, the power saving signal is a segment of sequence, the power saving signal may still be associated with a DMRS antenna port. The DMRS antenna port is the DMRS antenna port associated with reception of the power saving signal, and the power saving signal may be mapped to the DMRS antenna port associated with the power saving signal for transmission.

When the network device sends the power saving signal and the paging related signal in the beam scanning manner, the QCL relation optionally includes a QCL relation between the paging related signal and a power saving signal associated with the paging related signal. The power saving signal associated with the paging related signal includes a power saving signal meeting a predetermined relation with the paging related signal in a time domain and/or a frequency domain.

That is, the paging related signal and power saving signal meeting the predetermined relation in the time domain and/or the frequency domain are associated paging related signal and power saving signal.

Figure 5:
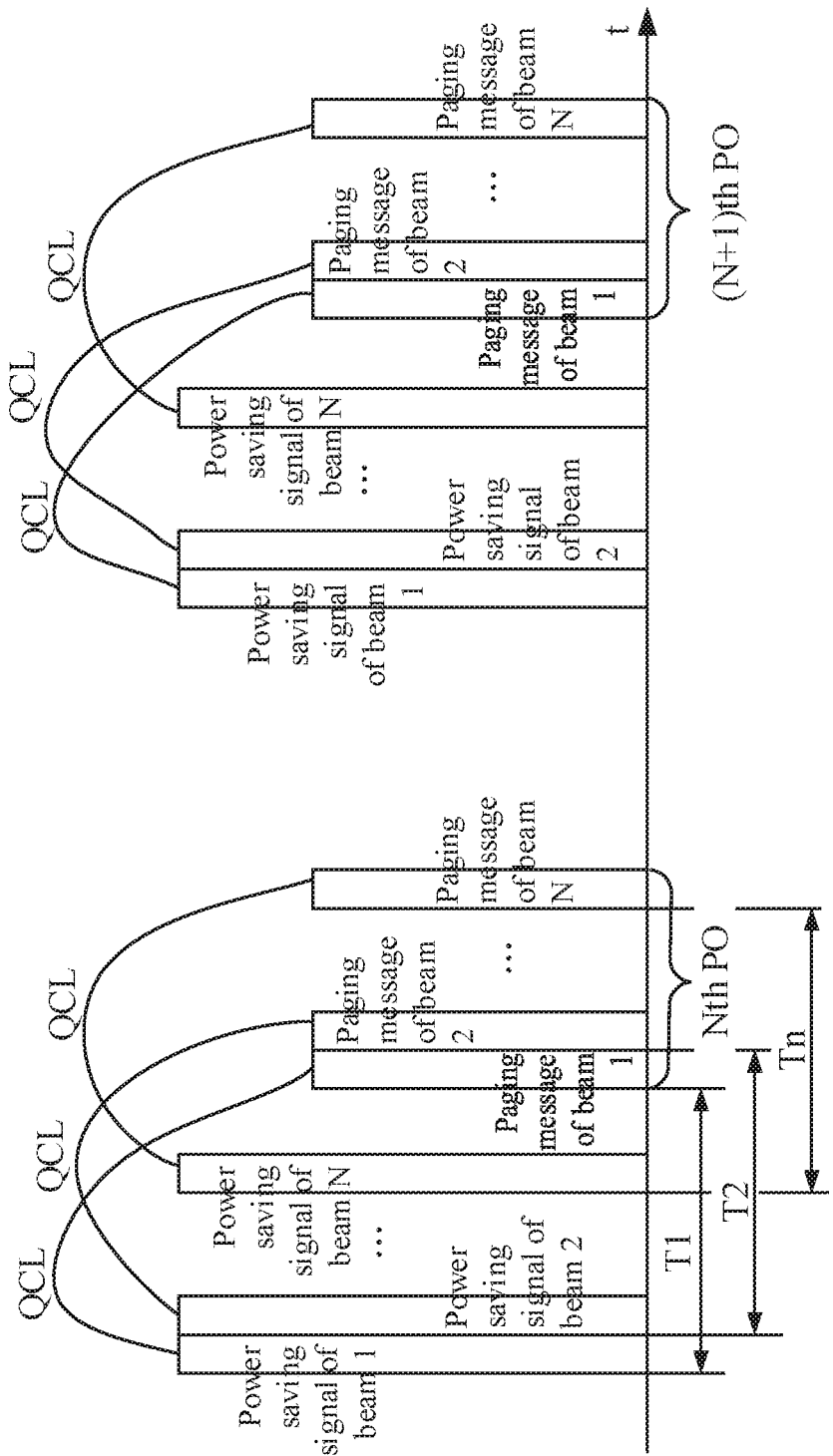
FIG. 5 is a schematic diagram of a power saving signal and a paging related signal associated with the power saving signal according to an implementation of the disclosure.

For example, as illustrated in FIG. 5, in each PO, a power saving signal sent by a beam 1 is spaced from a paging signal sent by the beam 1 by T1, a power saving signal sent by a beam 2 is spaced from a paging signal sent by the beam 2 by T2, . . . , and by parity of reasoning, a power saving signal sent by a beam N is spaced from a paging signal sent by the beam N by Tn in the time domain. T1 to Tn are the predetermined relation, and T1 to Tn may be equal or unequal to partially equal.

The power saving signal sent by the beam 1 is a power saving signal associated with the paging signal sent by the beam 1, the power saving signal sent by the beam 2 is a power saving signal associated with the paging signal sent by the beam 2, . . . , and by parity of reasoning, the power saving signal sent by the beam N is a power saving signal associated with the paging signal sent by the beam N.

Therefore, the power saving signal sent by the beam 1 is QCL with the paging signal sent by the beam 1, the power saving signal sent by the beam 2 is QCL with the paging signal sent by the beam 2, . . . , and by parity of reasoning, the power saving signal sent by the beam N is QCL with the paging signal sent by the beam N.

Optionally, the operation in 420 that the terminal device determines the QCL relation between the paging related signal and the power saving signal includes that: the terminal device acquires the QCL relation pre-stored in the terminal device.

Or, optionally, in 420, the terminal device receives the configuration information sent by the network device to obtain QCL information, the configuration information being used to indicate the QCL relation.

That is, the QCL relation may be configured by the network device, and may also be predetermined, for example, specified in a protocol.

Optionally, the method 400 further includes 430.

In 430, the terminal device receives the power saving signal based on the QCL relation, or, the terminal device receives the paging related signal based on the QCL relation.

Optionally, the QCL relation includes a QCL relation in terms of the spatial receiving parameter. The operation in 410 that the network device sends the power saving signal and the paging related signal includes that: the network device sends the paging related signal, and sends the power saving signal associated with the paging related signal by use of a sending beam of the paging related signal.

That is, the network device sends the paging related signal and the power saving signal associated with the paging related signal by use of the same sending beam.

For example, still as illustrated in FIG. 5, the network device sends a paging signal by use of the beam 1 and sends a power saving signal associated with the paging signal by use of the beam 1, the power saving signal associated with the paging signal being a power saving signal spaced from the paging signal by T1 in the time domain; the network device sends a paging signal by use of the beam 2 and sends a power saving signal associated with the paging signal by use of the beam 2, the power saving signal associated with the paging signal being a power saving signal spaced from the paging signal by T2 in the time domain; . . . ; and by parity of reasoning, the network device sends a paging signal by use of the beam N and sends a power saving signal associated with the paging signal by use of the beam N, the power saving signal associated with the paging signal being a power saving signal spaced from the paging signal by Tn in the time domain.

Correspondingly, optionally, the QCL relation includes the QCL relation in terms of the spatial receiving parameter. The operation in 430 that the terminal device receives the power saving signal based on the QCL relation includes that: the terminal device receives the power saving signal by use of an optimal receiving beam of the paging related signal and a spatial receiving parameter corresponding to the optimal receiving beam.

For example, still as illustrated in FIG. 5, the terminal device may select an optimal receiving beam of a paging message according to a detection result of the paging message in a present PO, i.e., an nth PO. For example, after paging messages of N beams are detected, it is found that the paging message with optimal receiving quality is the paging message received on the beam 2. Then, since the power saving signal and the paging related signal form the QCL relation in terms of the spatial receiving parameter, the terminal device may receive a power saving signal associated with the paging message in a next PO (i.e., an (n+1)th PO) by use of the beam 2 and a spatial receiving parameter corresponding to the beam 2 (for example, a configuration parameter of the receiving filter), and is not required to detect the power saving signal on all of the N beams.

Accordingly, according to the implementation of the disclosure, by establishing the QCL relation between the paging related signal and the power saving signal, and the terminal device, after determining an receiving beam of the paging message and the corresponding spatial receiving parameter, may receive the power saving signal based on the receiving beam of the paging message and the spatial receiving parameter, thereby avoiding receiving of the power saving signal on all beams sent by a network device, and achieving power saving.

Optionally, the method further includes that: the terminal device performs time-frequency synchronization based on the power saving signal and acquires a time-frequency synchronization parameter of the power saving signal.

The operation in 430 that the terminal device receives the paging related signal based on the QCL relation includes that: the terminal device receives the paging related signal by use of the time-frequency synchronization parameter of the power saving signal.

When the terminal device determines based on the indication of the power saving signal that there is a transmission of a paging message in a specific paging cycle, the terminal device is required to receive the paging message in the paging cycle. If the power saving signal is a segment of sequence and the segment of sequence has a time-frequency synchronization function, the terminal device may perform time-frequency synchronization based on the power saving signal; acquire the time-frequency synchronization parameter of the power saving signal, such as information of a time deviation and a frequency deviation; and receive, based on the time-frequency synchronization parameter, the paging related signal meeting the QCL relation between the paging related signal and the power saving signal, so that the reception performance of the paging message and the PDCCH for scheduling the paging message may be improved.

Optionally, the method further includes that: the network device determines a timing relation between the paging related signal and the power saving signal. In 410, the network device sends the power saving signal and the paging related signal according to the timing relation.

Correspondingly, the method optionally further includes that: the terminal device determines the timing relation between the paging related signal and the power saving signal.

The timing relation may be configured for the terminal device by the network device, or the timing relation is pre-stored in the terminal device, for example, predetermined in the protocol.

In 430, the terminal device may receive the power saving signal based on the QCL relation and the timing relation, or the terminal device receives the paging related signal based on the QCL relation and the timing relation.

The timing relation between the paging related signal and the power saving signal is a time relation between time when the network device sends the paging related signal and time when the network device sends the power saving signal, and is also a time relation between time when the terminal device receives the paging related signal and time when the terminal device receives the power saving signal. For example, if the timing relation represents that the power saving signal is earlier than the associated paging related signal by a time length $T_A$, the terminal device, after receiving the power saving signal, may receive the PDCCH meeting the QCL relation with the power saving signal and scheduling the paging message or receive the paging message based on the QCL relation after the time length $T_A$. Or, the terminal device, if determining a PO configured to receive the paging message, may also determine a time position for reception of the power saving signal and thus may receive the power saving signal meeting the QCL relation and the paging message at the corresponding time position based on the QCL relation.

In the implementation of the disclosure, since reception of the power saving signal and reception of the paging related signal meet the QCL relation, the terminal device may receive the power saving signal based on a reception condition of the paging related signal and the QCL relation, which improves the transmission performance of the power saving signal. Moreover, the terminal device may receive the paging related signal based on a reception condition of the power saving signal and the QCL relation, which improves the transmission performance of the paging related signal.

It is to be understood that, in various implementations of the disclosure, a magnitude of a sequence number of each process does not mean an execution sequence and the execution sequence of each process should be determined by its function and an internal logic and should not form any limit to an implementation process of the implementations of the disclosure.

The signal transmission method according to the implementations of the disclosure is described above in detail and a device according to the implementations of the disclosure will be described below in combination with FIG. 6 to FIG. 9. The technical characteristics described in the method implementations are applied to the following device implementations.

Figure 6:
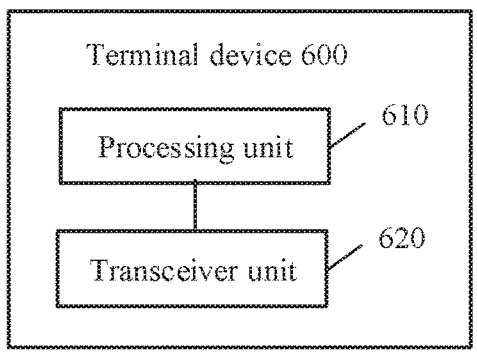
FIG. 6 is a schematic block diagram of a terminal device according to an implementation of the disclosure.

FIG. 6 is a schematic block diagram of a terminal device 600 according to an implementation of the disclosure. As illustrated in FIG. 6, the terminal device 600 includes a processing unit 610 and a transceiver unit 620.

The processing unit 610 is configured to determine a QCL relation between a paging related signal and a power saving signal, the paging related signal including a PDCCH for scheduling a paging message and/or a PDSCH for bearing the paging message.

The transceiver unit 620 is configured to receive the power saving signal based on the QCL relation determined by the processing unit 610, or, receive the paging related signal based on the QCL relation.

Accordingly, since reception of the power saving signal and reception of the paging related signal meet the QCL relation, the terminal device may receive the power saving signal based on a reception condition of the paging related signal and the QCL relation, which improves the transmission performance of the power saving signal. Moreover, the terminal device may receive the paging related signal based on a reception condition of the power saving signal and the QCL relation, which improves the transmission performance of the paging related signal.

Optionally, the QCL relation between the paging related signal and the power saving signal represents that a DMRS antenna port for receiving the paging related signal and a DMRS antenna port associated with reception of the power saving signal meet the QCL relation.

Optionally, the QCL relation includes a QCL relation between the paging related signal and the power saving signal in terms of at least one of a delay spread, a Doppler spread, a Doppler shift, an average delay or a spatial receiving parameter.

Optionally, the QCL relation includes a QCL relation between the paging related signal and a power saving signal associated with the paging related signal, the power saving signal associated with the paging related signal including a power saving signal meeting a predetermined relation with the paging related signal in a time domain and/or a frequency domain.

Optionally, the processing unit 610 is specifically configured to acquire the QCL relation pre-stored in the terminal device, or, receive configuration information sent by a network device through the transceiver unit 620, the configuration information being used to indicate the QCL relation.

Optionally, the QCL relation includes a QCL relation in terms of the spatial receiving parameter, and the transceiver unit 620 is specifically configured to receive the power saving signal by use of an optimal receiving beam of the paging related signal and a spatial receiving parameter corresponding to the optimal receiving beam.

Optionally, the processing unit 610 is further configured to perform time-frequency synchronization based on the power saving signal and acquire a time-frequency synchronization parameter of the power saving signal.

The transceiver unit 620 is specifically configured to receive the paging related signal by use of the time-frequency synchronization parameter, acquired by the processing unit 610, of the power saving signal.

Optionally, the processing unit 610 is further configured to determine a timing relation between the paging related signal and the power saving signal.

The transceiver unit 620 is specifically configured to receive the power saving signal based on the QCL relation and the timing relation, or, receive the paging related signal based on the QCL relation and the timing relation.

It is to be understood that the terminal device 600 may execute corresponding operations executed by the terminal device in the method 400 and, for simplicity, will not be elaborated herein.

Figure 7:
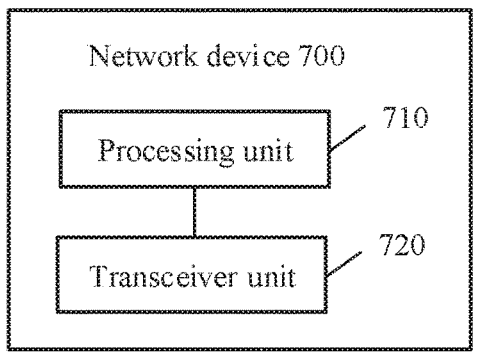
FIG. 7 is a schematic block diagram of a network device according to an implementation of the disclosure.

FIG. 7 is a schematic block diagram of a network device 700 according to an implementation of the disclosure. As illustrated in FIG. 7, the network device 700 includes a processing unit 710 and a transceiver unit 720.

The processing unit 710 is configured to generate a power saving signal and a paging related signal.

The transceiver unit 720 is configured to send the power saving signal and paging related signal generated by the processing unit 710 to enable a terminal device to receive the paging related signal or the power saving signal based on a QCL relation between the paging related signal and the power saving signal, the paging related signal including a PDCCH for scheduling a paging message and/or a PDSCH for bearing the paging message.

Accordingly, since reception of the power saving signal and reception of the paging related signal meet the QCL relation, the terminal device may receive the power saving signal based on an reception condition of the paging related signal and the QCL relation, which improves the transmission performance of the power saving signal. Moreover, the terminal device may receive the paging related signal based on an reception condition of the power saving signal and the QCL relation, which improves the transmission performance of the paging related signal.

Optionally, the QCL relation between the paging related signal and the power saving signal represents that a DMRS antenna port for receiving the paging related signal and a DMRS antenna port associated with reception of the power saving signal meet the QCL relation.

Optionally, the QCL relation includes a QCL relation between the paging related signal and the power saving signal in terms of at least one of a delay spread, a Doppler spread, a Doppler shift, an average delay OR a spatial receiving parameter.

Optionally, the QCL relation includes a QCL relation between the paging related signal and a power saving signal associated with the paging related signal, the power saving signal associated with the paging related signal including a power saving signal meeting a predetermined relation with the paging related signal in a time domain and/or a frequency domain.

Optionally, the QCL relation includes a QCL relation in terms of the spatial receiving parameter, and the transceiver unit 720 is specifically configured to send the paging related signal and send the power saving signal associated with the paging related signal by use of a sending beam of the paging related signal.

Optionally, the processing unit 710 is further configured to determine a timing relation between the paging related signal and the power saving signal.

The transceiver unit 720 is specifically configured to send the power saving signal and the paging related signal according to the timing relation.

Optionally, the transceiver unit 720 is further configured to send configuration information to the terminal device, the configuration information being used to indicate the QCL relation.

It is to be understood that the network device 600 may execute corresponding operations executed by the network device in the method 400 and, for simplicity, will not be elaborated herein.

Figure 8:
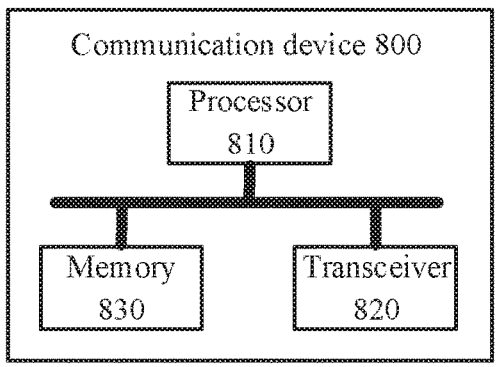
FIG. 8 is a schematic structure diagram of a communication device according to an implementation of the disclosure.

FIG. 8 is a schematic structure diagram of a communication device 800 according to an implementation of the disclosure. As illustrated in FIG. 8, the communication device includes a processor 810, a transceiver 820 and a memory 830. Herein, the processor 810, the transceiver 820 and the memory 830 communicate with one another through an internal connecting path. The memory 830 is configured to store an instruction, and the processor 810 is configured to execute the instruction stored in the memory 830 to control the transceiver 820 to receive a signal or send a signal.

Optionally, the processor 810 may call the program code stored in the memory 830 to execute corresponding operations of the terminal device in the method 400. For similarity, elaborations will be omitted herein.

Optionally, the processor 810 may call the program code stored in the memory 830 to execute corresponding operations, executed by a network device, in the method 400. For similarity, elaborations are omitted herein.

It is to be understood that the processor in the implementation of the disclosure may be an integrated circuit chip and has a signal processing capability. In an implementation process, each step of the method implementation may be completed by an integrated logical circuit of hardware in the processor or an instruction in a software form. The processor may be a universal processor, a Digital Signal Processor (DSP), an Disclosure Specific Integrated Circuit (ASIC), a Field Programmable Gate Array (FPGA) or another programmable logical device, discrete gate or transistor logical device and discrete hardware component. Each method, step and logical block diagram disclosed in the implementations of the disclosure may be implemented or executed. The universal processor may be a microprocessor or the processor may also be any conventional processor and the like. The steps of the method disclosed in combination with the implementations of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electically Erasable PROM (EEPROM) and a register. The storage medium is located in a memory, and the processor reads information in the memory, and completes the steps of the methods in combination with hardware.

It can be understood that the memory in the implementation of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 9:
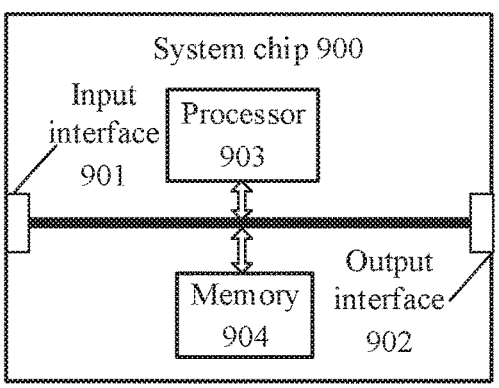
FIG. 9 is a schematic structure diagram of a system chip according to an implementation of the disclosure.

FIG. 9 is a schematic structure diagram of a system chip according to an implementation of the disclosure. The system chip 900 of FIG. 9 includes an input interface 901, an output interface 902, at least one processor 903 and a memory 904. The input interface 901, the output interface 902, the processor 903 and the memory 904 are connected with one another through an internal connecting path. The processor 903 is configured to execute a code in the memory 904.

Optionally, when the code is executed, the processor 903 may implement corresponding operations executed by a terminal device in the method 400. For simplicity, elaborations are omitted herein.

Optionally, when the code is executed, the processor 903 may implement corresponding operations executed by a network device in the method 400. For simplicity, elaborations are omitted herein.

It is to be understood that, in the implementations of disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm steps of each example described in combination with the implementations disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about the specific working processes of the system, device and unit described above may refer to the corresponding processes in the method implementation and will not be elaborated herein for convenient and brief description.

In some implementations provided by the disclosure, it is to be understood that the disclosed system, device and method may be implemented in another manner. For example, the device implementation described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the implementations according to a practical requirement.

In addition, each functional unit in each implementation of the disclosure may be integrated into a monitoring unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each implementation of the disclosure. The storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for signal transmission, comprising:
receiving, by a terminal device, a paging related signal;
determining, by the terminal device, a Quasi-Co-Located (QCL) relation between the paging related signal and a power saving signal, the paging related signal comprising a Physical Downlink Control Channel (PDCCH) for scheduling a paging message and/or a Physical Downlink Shared Channel (PDSCH) for bearing the paging message, the paging message adopting a Discontinuous Reception (DRX) mechanism, and the power saving signal being used to indicate whether the terminal detects the PDCCH in an on duration of a DRX cycle; and
receiving, by the terminal device, the power saving signal based on the QCL relation and the paging related signal;

wherein the QCL relation comprises a QCL relation between the paging related signal and the power saving signal in terms of at least one of:
a delay spread, a Doppler spread, a Doppler shift, an average delay or a spatial receiving parameter;
wherein determining, by the terminal device, the QCL relation between the paging related signal and the power saving signal comprises:
in response that each Paging Occasion (PO) comprises N paging related signals, determining one-to-one QCL relationships between N power saving signals and the N paging related signals, wherein i-th paging related signal and i-th power saving signal have a QCL relationship, wherein i=1, 2,..., N.

2. The method of claim 1, wherein the QCL relation between the paging related signal and the power saving signal represents that:
a De Modulation Reference Signal (DMRS) antenna port for receiving the paging related signal and a DMRS antenna port associated with reception of the power saving signal meet the QCL relation.

3. The method of claim 1, wherein the i-th paging related signal is spaced, by $T_i$ in time domain, from the i-th power saving signal having the QCL relationship with the i-th paging related signal, and
wherein $T_1$ to $T_N$ are equal or unequal or partially equal.

4. The method of claim 1, wherein
the QCL relation comprises: a QCL relation between the paging related signal and a power saving signal associated with the paging related signal, and
the power saving signal associated with the paging related signal comprises a power saving signal meeting a predetermined relation with the paging related signal in a time domain and/or a frequency domain.

5. The method of claim 1, wherein determining, by the terminal device, the QCL relation between the paging related signal and the power saving signal comprises:
acquiring, by the terminal device, the QCL relation pre-stored in the terminal device; or
receiving, by the terminal device, configuration information from a network device, the configuration information being used to indicate the QCL relation.

6. The method of claim 1, further comprising:
determining, by the terminal device, a timing relation between the paging related signal and the power saving signal,
wherein receiving, by the terminal device, the power saving signal based on the QCL relation comprises: receiving, by the terminal device, the power saving signal based on the QCL relation and the timing relation; and
receiving, by the terminal device, the paging related signal based on the QCL relation comprises: receiving, by the terminal device, the paging related signal based on the QCL relation and the timing relation.

7. A terminal device, comprising:
a transceiver, configured to receive a paging related signal; and
a processor, configured to determine a Quasi-Co-Located (QCL) relation between a paging related signal and a power saving signal, the paging related signal comprising a Physical Downlink Control Channel (PDCCH) for scheduling a paging message and/or a Physical Downlink Shared Channel (PDSCH) for bearing the paging message, the paging message adopting a Discontinuous Reception (DRX) mechanism, and the power saving signal being used to indicate whether the terminal detects the PDCCH in an on duration of a DRX cycle;
wherein the transceiver is further configured to receive the power saving signal based on the QCL relation determined by the processor and the paging related signal;
wherein the QCL relation comprises a QCL relation between the paging related signal and the power saving signal in terms of at least one of:
a delay spread, a Doppler spread, a Doppler shift, an average delay or a spatial receiving parameter;
wherein the processor is specifically configured to:
in response that each Paging Occasion (PO) comprises N paging related signals, determine one-to-one QCL relationships between N power saving signals and the N paging related signals, wherein i-th paging related signal and i-th power saving signal have a QCL relationship, wherein i=1, 2, . . . , N.

8. The terminal device of claim 7, wherein the QCL relation between the paging related signal and the power saving signal represents that:
a De Modulation Reference Signal (DMRS) antenna port for receiving the paging related signal and a DMRS antenna port associated with reception of the power saving signal meet the QCL relation.

9. The terminal device of claim 7, wherein
the QCL relation comprises: a QCL relation between the paging related signal and a power saving signal associated with the paging related signal, and
the power saving signal associated with the paging related signal comprises a power saving signal meeting a predetermined relation with the paging related signal in a time domain and/or a frequency domain.

10. The terminal device of claim 7, wherein the processor is specifically configured to:
acquire the QCL relation pre-stored in the terminal device; or
control the transceiver to receive configuration information from a network device, the configuration information being used to indicate the QCL relation.

11. The terminal device of claim 7, wherein the QCL relation comprises a QCL relation in terms of the spatial receiving parameter; and the transceiver is specifically configured to:
receive the power saving signal by using an optimal receiving beam of the paging related signal and a spatial receiving parameter corresponding to the optimal receiving beam.

12. The terminal device of claim 7, wherein the processor is further configured to:
perform, based on the power saving signal, time-frequency synchronization and acquire a time-frequency synchronization parameter of the power saving signal; and
the transceiver is specifically configured to:
receive the paging related signal by using the time-frequency synchronization parameter, acquired by the processor, of the power saving signal.

13. The terminal device of claim 7, wherein the processor is further configured to:
determine a timing relation between the paging related signal and the power saving signal; and
the transceiver is specifically configured to receive the power saving signal based on the QCL relation and the timing relation, or receive the paging related signal based on the QCL relation and the timing relation.

14. A network device, comprising:
a processor, configured to generate a power saving signal and a paging related signal; and
a transceiver, configured to:
  send the paging related signal generated by the processor, and send the power saving signal to enable a terminal device to receive the power saving signal based on a Quasi-Co-Located (QCL) relation between the paging related signal and the power saving signal and the paging related signal, the paging related signal comprising a Physical Downlink Control Channel (PDCCH) for scheduling a paging message and/or a Physical Downlink Shared Channel (PDSCH) for bearing the paging message, the paging message adopting a Discontinuous Reception (DRX) mechanism, and the power saving signal being used to indicate whether the terminal detects the PDCCH in an on duration of a DRX cycle;
wherein the QCL relation comprises a QCL relation between the paging related signal and the power saving signal in terms of at least one of:
a delay spread, a Doppler spread, a Doppler shift, an average delay or a spatial receiving parameter;
wherein in response that each Paging Occasion (PO) comprises N paging related signals, one-to-one QCL relationships between N power saving signals and the N paging related signals are determined, wherein i-th paging related signal and i-th power saving signal have a QCL relationship, wherein i=1, 2,..., N.

15. The network device of claim 14, wherein the QCL relation between the paging related signal and the power saving signal represents that:

a De Modulation Reference Signal (DMRS) antenna port for receiving the paging related signal and a DMRS antenna port associated with reception of the power saving signal meet the QCL relation.

16. The network device of claim 14, wherein
the QCL relation comprises: a QCL relation between the paging related signal and a power saving signal associated with the paging related signal, and
the power saving signal associated with the paging related signal comprises a power saving signal meeting a predetermined relation with the paging related signal in a time domain and/or a frequency domain.

17. The network device of claim 16, wherein the QCL relation comprises a QCL relation in terms of the spatial receiving parameter; and the transceiver is specifically configured to:
send the paging related signal and send the power saving signal associated with the paging related signal by using a sending beam of the paging related signal.

18. The network device of claim 14, wherein the processor is further configured to:
determine a timing relation between the paging related signal and the power saving signal; and
the transceiver is specifically configured to send the power saving signal and the paging related signal according to the timing relation.

19. The network device of claim 14, wherein the transceiver is further configured to:
send configuration information to the terminal device, the configuration information being used to indicate the QCL relation.

* * * * *